I. W. NONNEMAN.
RATCHET DIE STOCK.
APPLICATION FILED JAN. 2, 1917.

1,238,558.

Patented Aug. 28, 1917.
2 SHEETS—SHEET 1.

Inventor
J. W. Nonneman,
By McGill & Maguire,
Attorneys

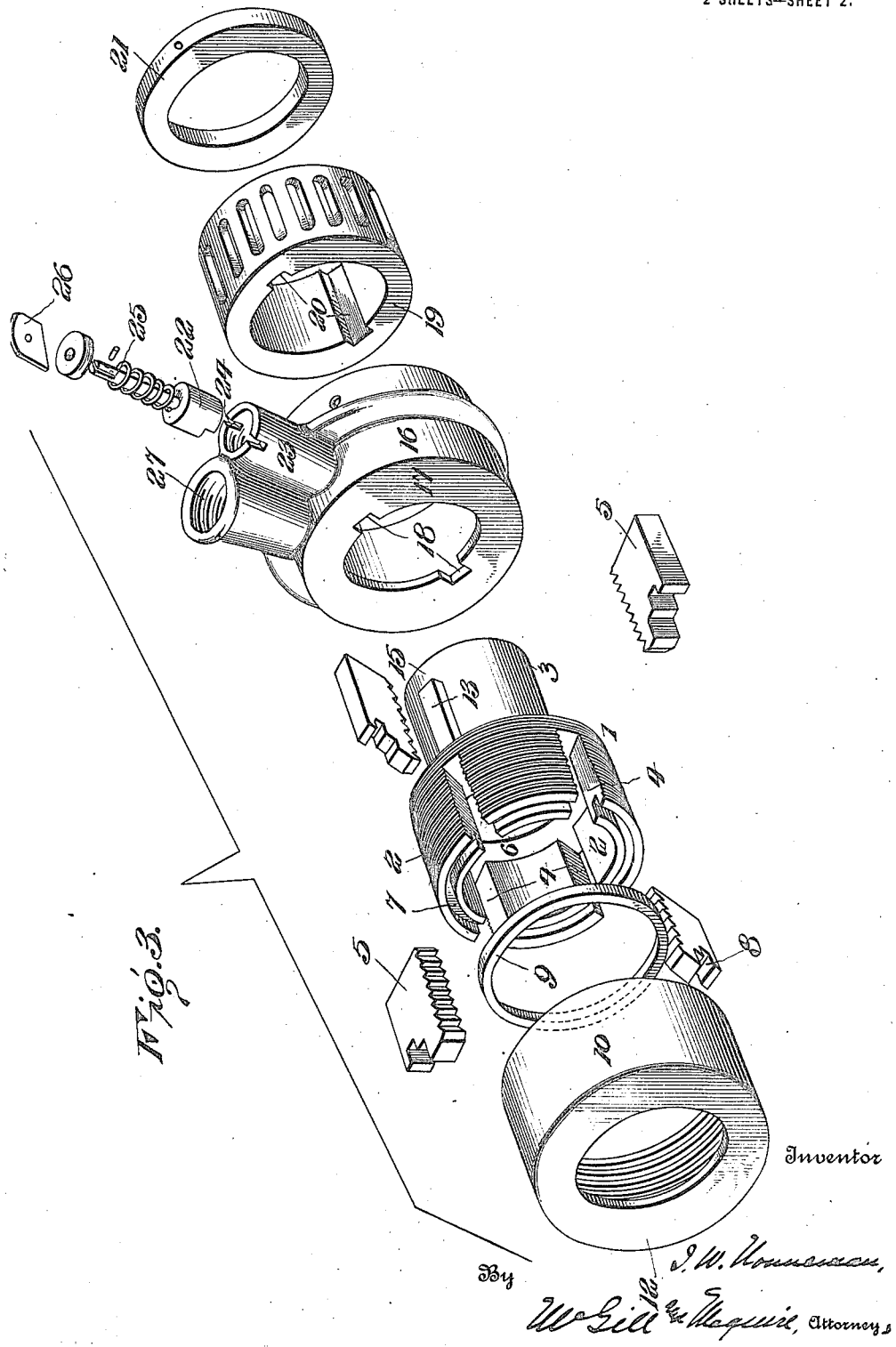

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

RATCHET-DIE STOCK.

1,238,558.  Specification of Letters Patent.  Patented Aug. 28, 1917.

Application filed January 2, 1917. Serial No. 140,166.

*To all whom it may concern:*

Be it known that I, IRA W. NONNEMAN, of Warren, in the county of Trumbull and State of Ohio, have invented certain new and useful Improvements in Ratchet-Die Stocks; and I do hereby declare the following to be a full, clear, and exact description of the invention, such as will enable others skilled in the art to which it appertains to make and use the same.

My object is to improve the construction of that class of die stocks made in the form of small tools adapted for use in restricted spaces.

Figure 1:
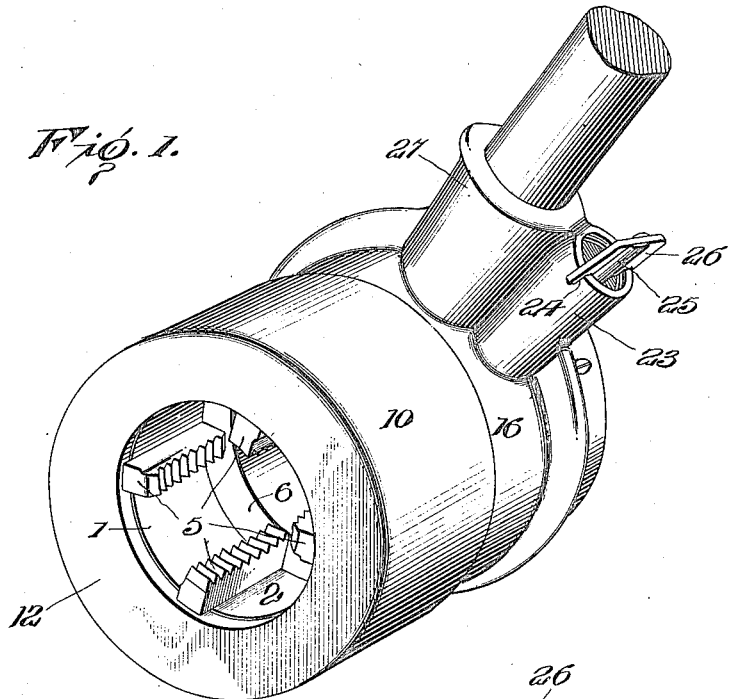
Figure 2:
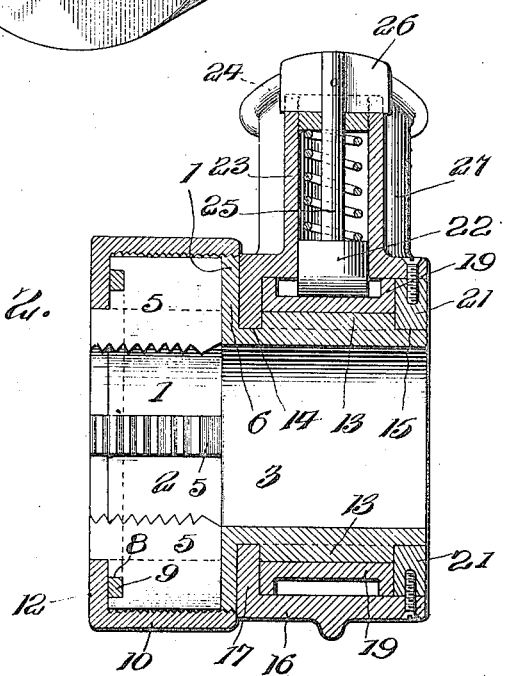

In the accompanying drawings, Figure 1 is a perspective view of a ratchet die stock embodying my invention. Fig. 2 is a vertical section, and Fig. 3 is a perspective of the parts detached.

As illustrated, the die-head 1 has an enlarged forward circular portion 2 constituting the die holder and a rearward extension 3 of less diameter than the die holder. The die holder is shown formed with a series of radial slots or recesses 4 to receive the dies 5. The recesses are shown extended from the outer face of the die holder to near its inner wall 6 and intersecting its periphery. The outer face of the die holder has an annular channel 7 formed with square walls. Each of the dies when seated has its top surface and outer end flush with the adjacent surfaces of the die holder, its outer end being formed with a squared groove 8 to register with channel 7 and the surfaces at either side of the groove being flush with the rims at either side of the channel 7. A ring 9 is seated in the channel 7 and grooves 8. It is shown of formation corresponding to the channel and grooves, that is, of angular formation, square or rectangular in cross section.

10 is a cap inclosing the die holder, preferably by threaded engagement, and having an inward projecting flange 12 which maintains the ring 9 in the channel 7. The periphery of the cap completely encircles the die holder and keeps it in shape, thereby compensating for the interruptions in its surface caused by the recesses 4. The cap also holds the dies in place by contact with both the ring 9 and the tops of the dies.

The tubular extension 3 of the die-head is shown formed with a pair of keys 13 intermediate its length, that is, providing a space 14 between the keys and the wall 6 of the die holder, and a space 15 between the keys and the free end of the extension.

The ratchet housing 16 is of peculiar formation. It has an annular flange 17 at its outer face formed with key ways 18 to receive the keys 13 when the parts are assembled. The ratchet 19 is shown movable within the housing and is also formed with key ways 20 to receive the keys 13. A keeper ring 21 is shown secured to the inner face of the housing. It forms a bearing for the surface 15 of the tubular extension and coacts with the flange 17 to keep the ratchet in place.

When in their normal working positions the keys 13 are within key ways 20 of the ratchet, and the flange 17 of the housing is in engagement with the tubular extension at the point 14 thereof and close to, or in contact with, wall 6 of the die holder, thus rendering the housing and ring 21 movable independently of the die-head but maintaining the head and the ratchet locked together.

The pawl 22 is shown mounted in a boss 23 on the housing, the boss having a transverse cleft 24 in its outer edge. A spring wound upon the pin 25 tends to hold the pawl projected into engagement with the ratchet. The pin has a winged tip 26 normally seated in the cleft and adapted to be withdrawn and placed transversely thereof to remove the pawl from the ratchet. 27 designates the usual socket to receive an operating handle.

The disposition of the notches in the ratchet relative to the key ways 18 is such that with the parts in operative positions the keys 13 are out of alinement with the key ways 18 when the pawl is in engagement with any one of the notches.

It will be noted that the formation of part 3 of the die head, and that of the ratchet housing 16, permit of the die head being used with any housing whether one having the ratchet as herein shown or any other type of handle holder.

I claim as my invention:

1. In a die stock, a die holder consisting of a circular member having radial recesses and an annular channel in one of its faces, dies adapted to be received by said recesses and having grooves to aline with said channel, a ring seated in said channel and grooves, and a cap fitting over said die holder and having an annular flange contacting with said ring.

2. In a die stock, a die holder consisting of a circular member having radial recesses intersecting its periphery, and formed with an annular channel in its outer face, dies seated in said recesses having their tops flush with the periphery of said die holder and having grooves to aline with said channel, a ring in said channel and grooves, and a cap adapted to fit over said die holder and contact with the tops of said dies, and having an annular flange adapted to contact with said ring.

3. In a die stock, a die holder consisting of a circular member having radial recesses and an annular channel having angular walls formed in one of its faces, dies adapted to be seated in said recesses and having angular grooves to aline with said channel, an angular ring received by, and conforming in shape to, said channel and grooves, and a cap fitting over said die holder and having an annular flange contacting with said ring.

4. In a die stock, the combination with a die head having a tubular extension provided with keys, of a housing adapted to rest directly upon said extension and constituting a handle holder, said housing having key ways to admit said keys.

5. In a die stock, the combination with a die head having a tubular extension provided with keys, of a housing adapted to receive said extension and having a flange on its outer face formed with key ways to admit said keys, and a ratchet within said housing and formed with key ways to receive said keys.

6. In a die stock, the combination with a die head having a tubular extension provided with keys terminating short of its length, of a housing adapted to receive said extension and having a flange on its outer face formed with key ways and adapted to be seated on said extension in front of said keys, a ratchet movable in said housing and formed with key ways to receive said keys, and a ring secured to the inner face of said housing and forming a bearing for the free end of said extension in rear of said keys.

In testimony whereof, I have signed this specification.

IRA W. NONNEMAN.